United States Patent [19]

Remolona

[11] 4,154,048

[45] May 15, 1979

[54] FRUIT PICKING DEVICE

[76] Inventor: Eli J. Remolona, 57 Alley I, Project 6, Quezon City, Philippines

[21] Appl. No.: 778,242

[22] Filed: Mar. 16, 1977

[51] Int. Cl.² ............................................ H01D 46/00
[52] U.S. Cl. ...................................................... 56/338
[58] Field of Search .................................. 56/332-338

[56] References Cited

U.S. PATENT DOCUMENTS

| 1,303,885 | 5/1919 | Goussy ................................... 56/335 |
| 1,585,080 | 5/1926 | Caldwell ................................. 56/338 |
| 2,246,747 | 6/1941 | Metzger ................................. 56/335 |
| 2,346,986 | 4/1944 | Metzger ................................. 56/335 |
| 2,603,056 | 7/1952 | Mellinger et al. ..................... 56/338 |
| 3,164,944 | 1/1965 | Polk, Jr. ................................. 56/338 |

*Primary Examiner*—Russell R. Kinsey
*Attorney, Agent, or Firm*—Bucknam and Archer

[57] ABSTRACT

The invention herein described relates to a fruit picking device of the pole-type employing a manually operable hydraulic master assembly to operate a cutting assembly for severing the fruit with its stem and receiving said severed fruit in a net provided therewith. A pole attachment is secured at the end of said pole and a rim having a net is secured to said attachment for an angular adjustment with respect to the pole axis. The hydraulically operated cutting assembly is secured to said rim.

3 Claims, 5 Drawing Figures

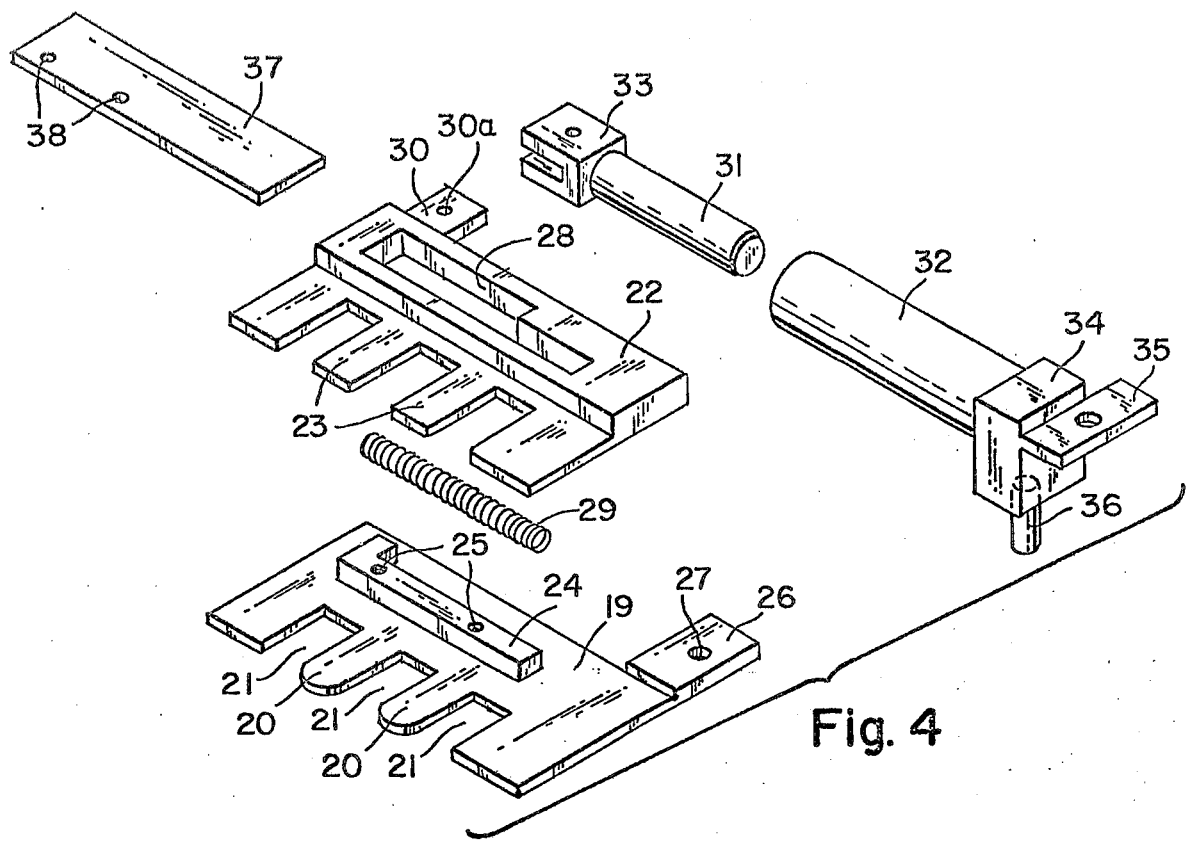
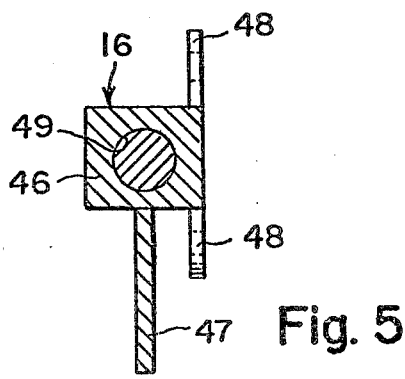
Fig. 4
Fig. 5

FRUIT PICKING DEVICE

This invention relates generally to devices for fruit harvesting and more specifically to a pole-type fruit picking device which is hand-carried and manually operated.

The old way of picking fruits from fruit trees is by the use of the pole-type method which is provided either with or without a net and provides for striking at the fruit to sever it from the stem. However, such devices have not generally been acceptable due to the damage incurred on the fruit upon striking or when falling to the ground. The damage incurred reduces its commercial value.

Accordingly, it is a principal object of this invention to provide a fruit picking device wherein the aforecited disadvantages are overcome.

A further object of this invention is to provide a fruit picking device which can easily and conveniently be manipulated by the picker and which is relatively light in weight.

A still further object of this invention is to provide a fruit picking device wherein a lever and hydraulic master assembly are used to operate a shear assembly in cutting the fruit stem.

Another object is to provide a fruit picking device having a pole attachment whereby the angle of approach of the cutting assembly to the fruit stem may be varied from horizontal cutting angle with respect to the pole axis to a 90-degree cutting angle.

Other objects are simplicity, and economy in construction, portability, low cost and dependability in its use.

With these objects in view as well as other objects and advantages will hereinafter become apparent upon the reading of detailed description in conjunction with the accompanying drawings wherein:

FIG. 4 is an exploded view of the cutting assembly; and

FIG. 5 is a cross-sectional view taken along line 5—5 of FIG. 1.

Figure 1:
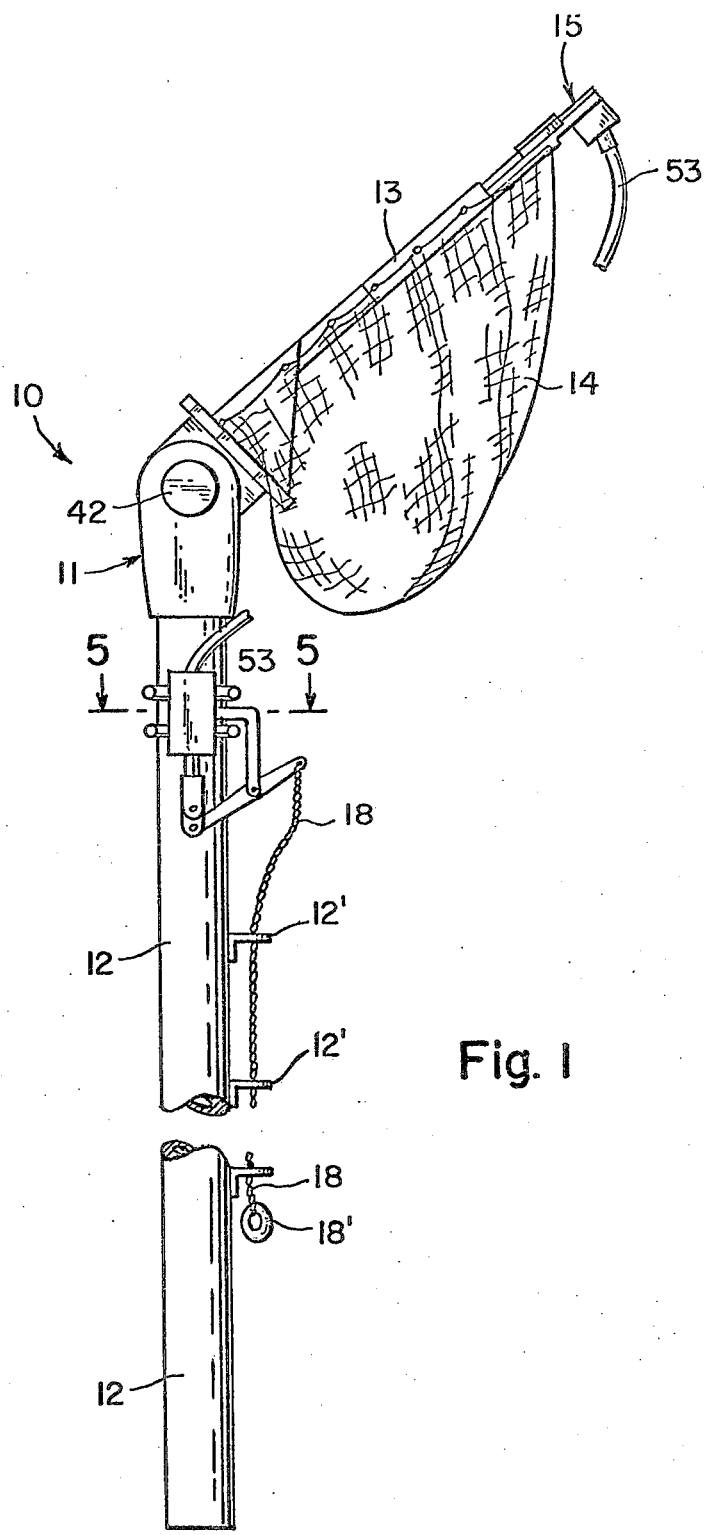
FIG. 1 is a front view of the fruit picking device.
Figure 2:
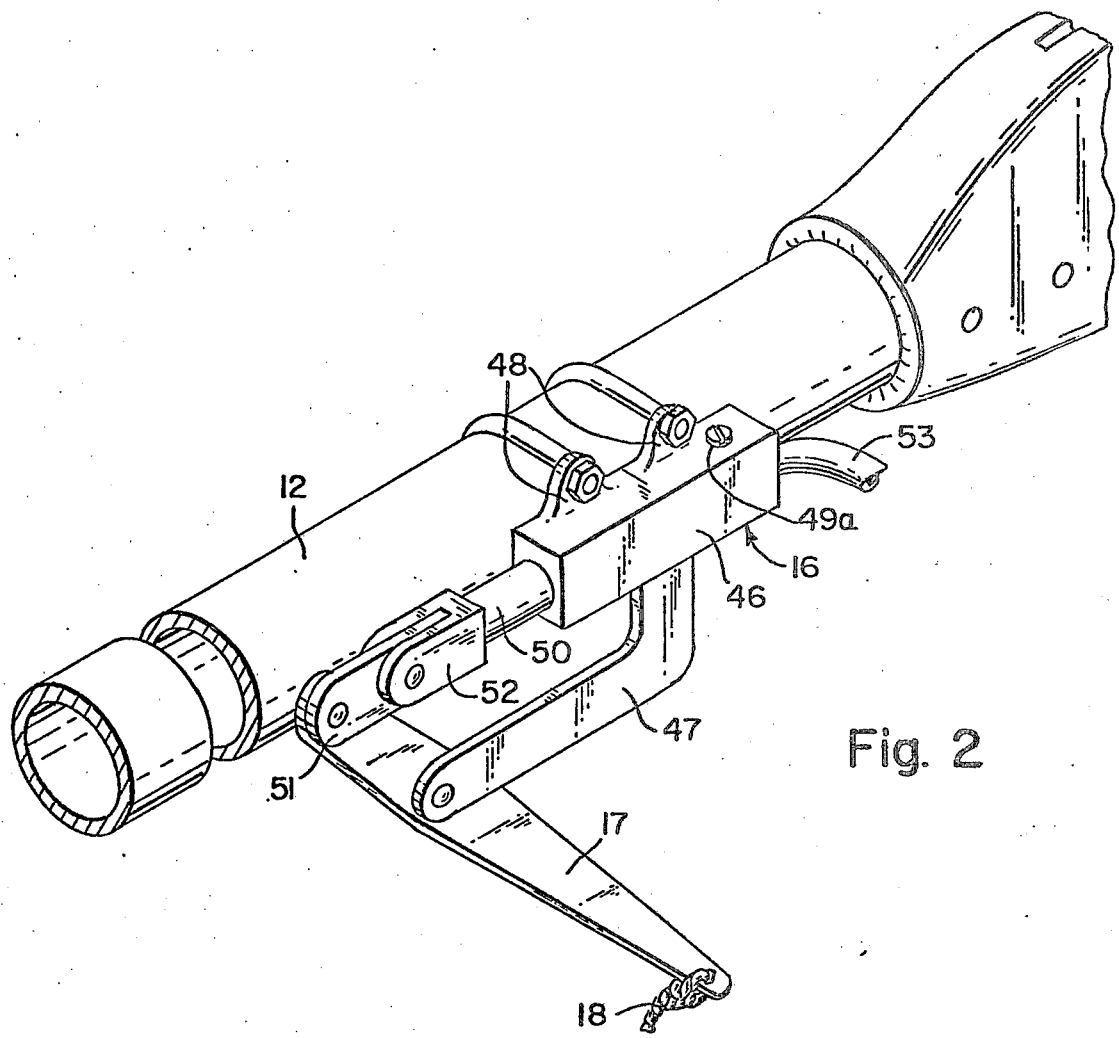
FIG. 2 is a fragmentary perspective view showing the hydraulic master assembly and a portion of the pole variable attachment.
Figure 3:
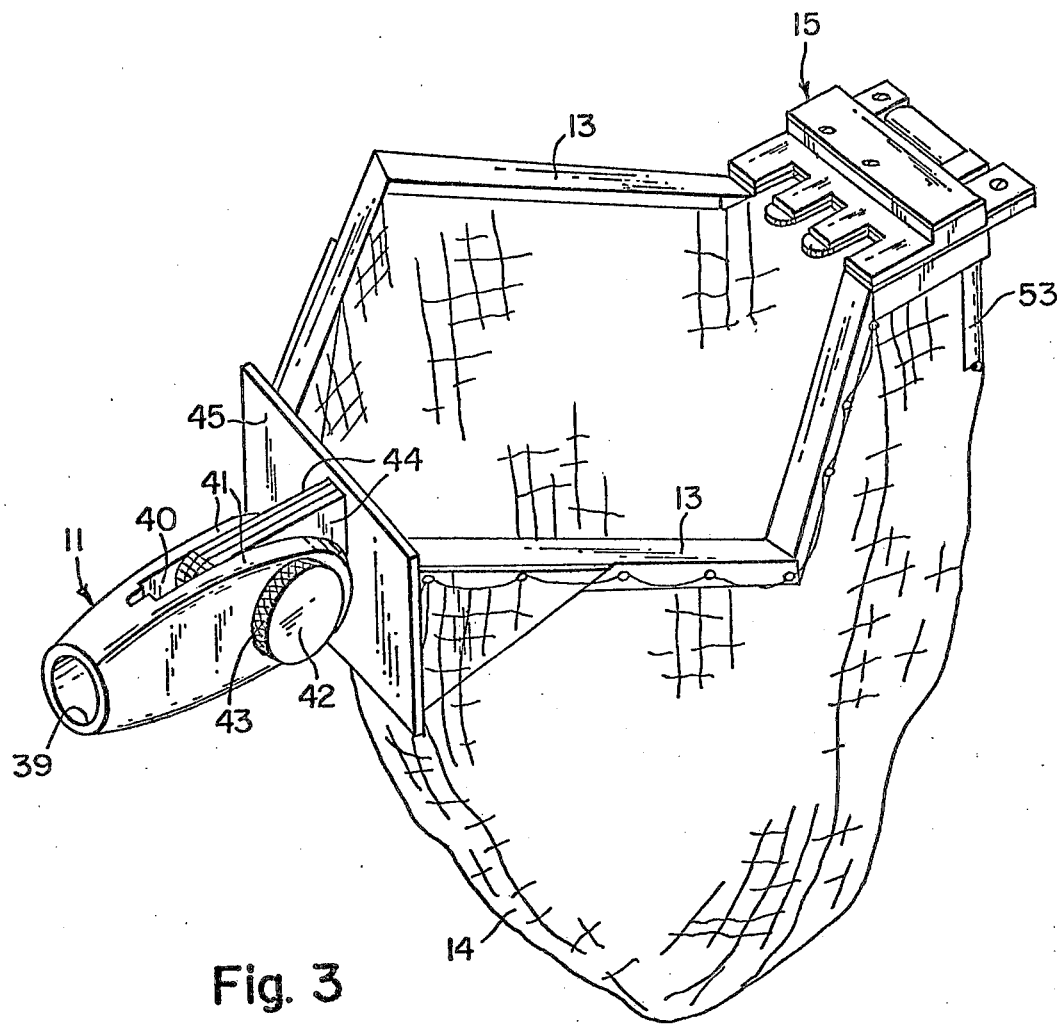
FIG. 3 is a fragmentary perspective view showing the pole attachment, the net rim and the cutting assembly.

Referring now more specifically to the drawings, the fruit picking device referred in general as 10 comprises a pole attachment 11 mounted at the upper end of a pole 12, a net rim 13 having a portion secured to said attachment and a net 14 secured therewith and a cutting assembly 15 connected to the opposite portion of said rim. Clamped to the pole 12 is the hydraulic master assembly 16 having an actuating lever 17. A cable 18 is connected to said lever 17 and extends to the lower end of said pole. A squeeze type handle (not shown) could be mounted on said pole within a convenient gripping reach of a picker.

As clearly shown in FIG. 4, the cutting assembly 15 comprises a fixed member 19 having stationary blades 20 which define three spaces 21, and a movable member 22 having blades 23 disposed in an overlapping relationship with said fixed blades when not in use. Said fixed member 19 is provided with an L-shaped element 24 having threaded holes 25 and disposed rearwardly of its blades in an off-set position and an ear 26 having a hole 27 extending rearwardly at the right side thereof. The movable member 22 is provided with an L-shaped aperture 28 vertically aligned with said element, the wider portion of which is so designed to accommodate therein a compression spring 29 and said embossment and the narrower portion of which is slightly extended to permit the longer leg of said element 24 to slide therein. An ear 30 having a hole 30a extends rearwardly from member 22 at the left side thereof.

A plunger 31 and a cylinder 32 combination is operably connected at the rear end of said cutting assembly. The plunger 31 is bolted to the ear 30 of the movable member through the yoke 33 and the cylinder 32 wherein the plunger 31 slidingly and sealingly fits therein is bolted to the ear 26 of the fixed member 19 through the block member 34 having an extension member 35. A flexible hose fitting 36 communicating with the said cylinder 32 is provided on said block member. A hold down plate 37 having holes 38 in alignment with the threaded hole 25 is disposed to hold said fixed member 19, movable member 22 and the spring 29 in operational relationship with each other.

The pole attachment 11 is provided with a bore 39 at its lower end wherein the pole 12 is inserted and at the other end there is a slot 40 which is defined by a pair of identical flanges 41. A tightening bolt 42 having a knurled head 43 is connected to said flanges 41. Within said slot are placed two asbestos lining elements 44 which are fixedly secured to a plate 45 which plate is secured therewith the rim 13. By loosening the bolt, the angular disposition of the rim and cutting assembly could be varied from a horizontal cutting to a 90 degree cutting angle with respect to the pole axis.

The hydraulic master assembly 16 comprises a body member 46 having an L-shaped arm 47 and ear portions 48 for clamping said body member to said pole 12, said body member having therein a cylindrical bore 49 extending axially therethrough. A hole 49a provided with a plug communicates with said bore. A plunger 50 is fitted within said bore and is actuated by the actuating lever 17, the upper end of which is pivotally connected to the link 51 that is in turn pivotally connected to the yoke 52 of the plunger. At the lower end is attached therewith the operating cable 18.

At the end of the cylindrical bore 49 a flexible hose 53 is connected, the other end of which is connected to the hose fitting 36 of the cutting assembly.

The operation of this device is very simple. Fluid is poured into the filling hole 49a to completely fill the hose 53. A plug is provided for said hole. By pulling the cable 18, the plunger 50 pushes the fluid in said hose and actuates the plunger 31 of the cutting assembly to move the blades for a cutting action. Upon release of the actuating lever, the spring-loaded movable member 22 returns immediately to its normal position by the action of the spring 29. With this operation of the device, it can be seen that when the fruit stems are disposed within the spaces defined by the stationary blades 20 for cutting purposes, the pieces of fruit are also positioned within the rim 13 to be received by the net 14.

I claim:

1. A fruit picking device comprising a pole; a pole attachment secured at the upper end of said pole; a net rim, a portion of said rim being secured to said attachment and being mounted at the forward end of said attachment to vary the angular disposition of said rim; a net secured to said rim; a cutting assembly fixedly secured to the opposite portion of said rim; said assembly comprising a stationary member and a spring-loaded movable member actuated by hydraulic pressure; a hydraulic master assembly clamped on said pole, said assembly comprising a body member having a cylinder extending axially therethrough and a plunger fitted therein, said body member having a filling hole communicating with said cylinder; a flexible hose connected at the end of said cylinder and the other end of which is connected to the cylinder of said cutting assembly; an actuating lever operably connected to said hydraulic master assembly and an operating cable connected at the lower end of said lever and extending to the lower end of said pole.

2. A fruit picking device according to claim 1 wherein the cutting assembly consists of a plurality of stationary blades which define therebetween forwardly open spaces, a movable member having movable blades and springing means actuating said movable member.

3. A fruit picking device assembly according to claim 1 wherein said pole attachment is adapted to permit the cutting angle of said cutting assembly to be adjusted through a range of 90 degrees with respect to the pole axis.

* * * * *